(12) United States Patent
Tsay

(10) Patent No.: US 7,007,908 B2
(45) Date of Patent: Mar. 7, 2006

(54) SUCKING DISK TYPE HANGING POLE

(76) Inventor: Wen-Feng Tsay, P. O. Box 24-108, Taipei (TW)

( * ) Notice: Subject to any disclaimer, the term of this patent is extended or adjusted under 35 U.S.C. 154(b) by 0 days.

(21) Appl. No.: 10/873,444

(22) Filed: Jun. 23, 2004

(65) Prior Publication Data

US 2005/0284998 A1 Dec. 29, 2005

(51) Int. Cl.
*F16B 47/00* (2006.01)
(52) U.S. Cl. .............................. 248/309.3; 248/205.5; 248/160
(58) Field of Classification Search ............ 248/205.8, 248/205.7, 205.5, 205.9, 206.1, 309.3, 160, 248/161, 176.1
See application file for complete search history.

(56) References Cited

U.S. PATENT DOCUMENTS

| | | | | |
|---|---|---|---|---|
| 3,020,017 A | * | 2/1962 | Watson | 248/205.8 |
| 3,082,988 A | * | 3/1963 | Holden | 248/205.8 |
| 4,593,947 A | * | 6/1986 | Yocum | 294/64.1 |
| 6,138,041 A | * | 10/2000 | Yahia | 455/569.2 |
| 6,749,160 B1 | * | 6/2004 | Richter | 248/206.2 |
| 2003/0029961 A1 | * | 2/2003 | Hollinger | 242/597.7 |
| 2003/0230694 A1 | * | 12/2003 | Kalb | 248/363 |
| 2004/0124325 A1 | * | 7/2004 | Kwok | 248/205.8 |
| 2004/0256529 A1 | * | 12/2004 | Richter | 248/309.1 |

* cited by examiner

*Primary Examiner*—Kimberly Wood
*Assistant Examiner*—Amy J. Sterling
(74) *Attorney, Agent, or Firm*—Troxell Law Office, PLLC

(57) ABSTRACT

The present invention discloses an improved sucking disk type hanging pole which comprises a protruded shaft on top and a rubber sucking disk on bottom, a stand with a connecting sleeve on top and a shell plate on bottom, a flexible hanging pole and a retaining base for coupling a retained object; wherein the disk body of the stand is smaller than the rubber sucking disk; a through hole is disposed at the center and interconnected to a bar-shaped sliding groove; a spring disposed in the through hole props a protruded cylindrical shaft of the sucking disk body is; a pivotal axle rod of the protruded cylindrical shaft passes through a sliding groove and pivotally connects with a latch member, and the board latch member at its periphery comprises a cam edge for contacting and supporting a shell plate of the stand, so that the cam edge pushes the shell plate to move back and forth by turning the latch member in order to drive the protruded pole together by the spring to loosen the rubber sucking disk and allow the groove slot to deform the shell plate more easily and facilitate the slightly curved surface to have the sucking or loosening effects. Further, with the flexibility of the hanging pole, the present invention allows user to quickly adjust the direction and height of the retaining base and facilitate carrying a heavy load on a smooth fixing object such as a ceramic tile or glass.

4 Claims, 3 Drawing Sheets

SUCKING DISK TYPE HANGING POLE

BACKGROUND OF THE INVENTION

1. Field of the Invention

The present invention relates to an improved sucking disk type hanging pole, more particularly to a sucking disk type hanging pole that enhances the convenience and reliability of the suction of the sucking disk. The present invention comprises a protruded cylindrical shaft at its top and a sucking disk body with a rubber sucking disk disposed at its bottom, a stand with a connecting sleeve on top and a shell plate on bottom, a flexible pole and a retaining base for coupling a retained object; wherein the disk body of the stand is slightly smaller than the sucking disk, and the sucking disk body has a groove; a through hole is disposed at the center of the bottom and interconnected to a bar-shaped sliding track at a lateral edge; a spring is propped in the protruded cylindrical shaft of the sucking disk body; a pivotal axle rod of the protruded cylindrical shaft passes through a sliding groove and pivotally connects with a latch member, and the board latch member at its periphery comprises a cam edge for contacting and supporting a shell plate of the stand, so that the cam edge pushes the shell plate to move back and forth by turning the latch member in order to drive the protruded pole together by the spring to loosen the rubber sucking disk and allow the groove slot to deform the shell plate more easily and facilitate the slightly curved surface to have the sucking or loosening effects. Further, with the flexibility of the hanging pole, the present invention allows user to quickly adjust the direction and height of the retaining base and facilitate carrying a heavy load on a smooth fixing object such as a ceramic tile or glass.

2. Description of the Related Art

In general, mobile phone holders, towel racks and hanging hooks are fixed and fastened by screws or glues, and they are not easy to be removed or changed positions once fixed. The method is not easy to be applied to smooth and easily shattered fixing objects such as glass or ceramic tile, and may damage the surface of the fixing object easily. Therefore, it is necessary to improve the traditional method by adopting a sucking disk to fix the pole. Since the sucked wall is usually not a flat surface but is a curved one such as the windows of a car, therefore such sucking disk type hanging pole can give limited sucking strength and thus having a more complicated structure and incurring a higher manufacturing cost, therefore it is necessary to further study and improve the prior art.

SUMMARY OF THE INVENTION

In view of the description above, the inventor of the present invention based on years of experience on designing and manufacturing hanging pole products to conduct experiments and tests to overcome the aforementioned shortcomings of the prior art and finally invented the improved sucking disk type hanging pole in accordance with the present invention.

The primary objective of the present invention is to provide an improved sucking disk type hanging pole, which comprises a protruded shaft on top and a rubber sucking disk on bottom, a stand with a connecting sleeve on top and a shell plate on bottom, a flexible hanging pole and a retaining base for coupling a retained object; wherein the disk body of the stand is smaller than the rubber sucking disk; a through hole is disposed at the center and interconnected to a bar-shaped sliding groove; a spring disposed in the through hole props a protruded cylindrical shaft of the sucking disk body is; a pivotal axle rod of the protruded cylindrical shaft passes through a sliding groove and pivotally connects with a latch member, and the board latch member at its periphery comprises a cam edge for contacting and supporting a shell plate of the stand, so that the cam edge pushes the shell plate to move back and forth by turning the latch member in order to drive the protruded pole together by the spring to loosen the rubber sucking disk and allow the groove slot to deform the shell plate more easily and facilitate the slightly curved surface to have the sucking or loosening effects. Further, with the flexibility of the hanging pole, the present invention allows user to quickly adjust the direction and height of the retaining base and facilitate carrying a heavy load on a smooth fixing object such as a ceramic tile or glass.

DETAILED DESCRIPTION OF THE PREFERRED EMBODIMENTS

Figure 1:
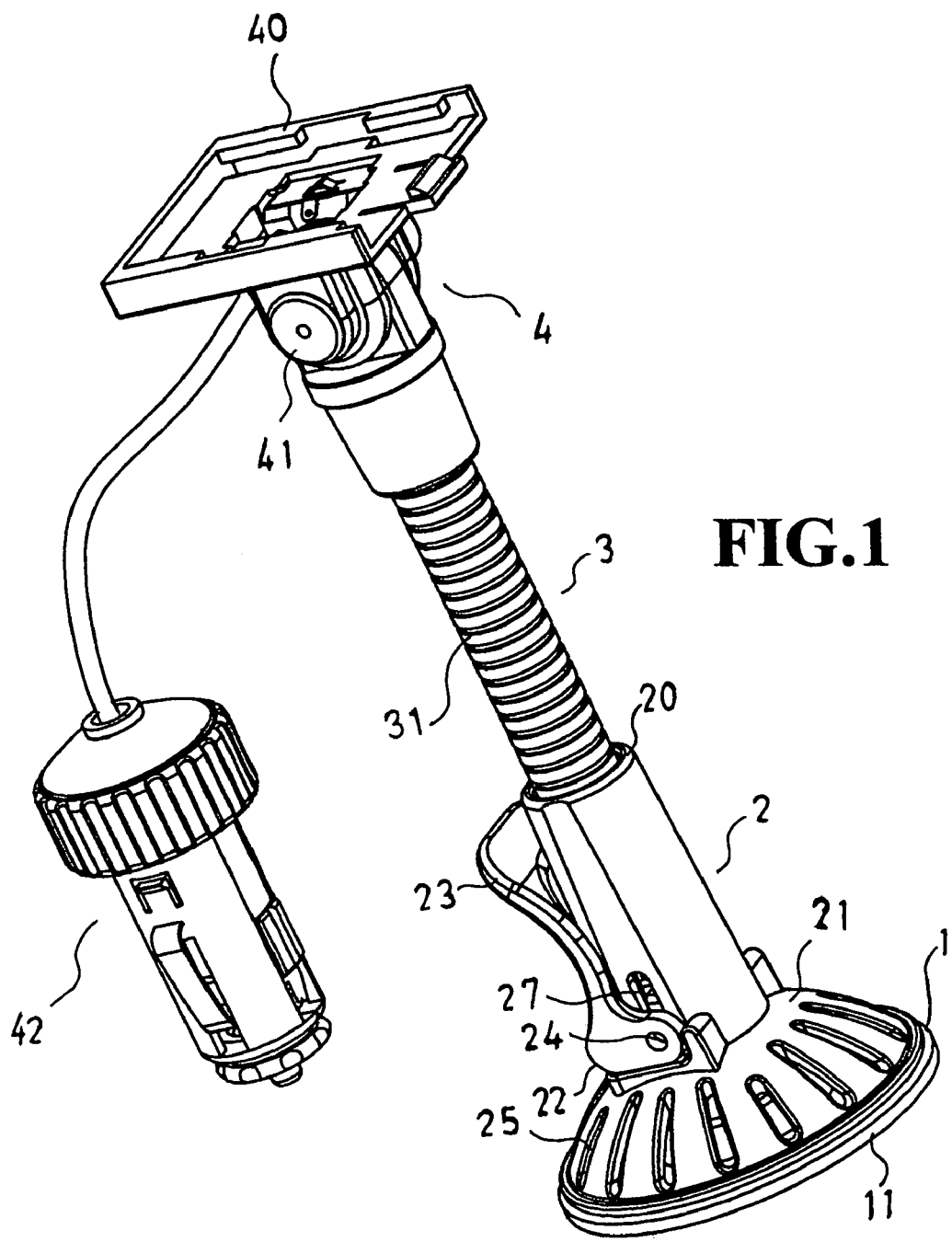
FIG. 1 is a perspective view of the sucking disk type hanging pole according to a preferred embodiment of the present invention.
Figure 2:
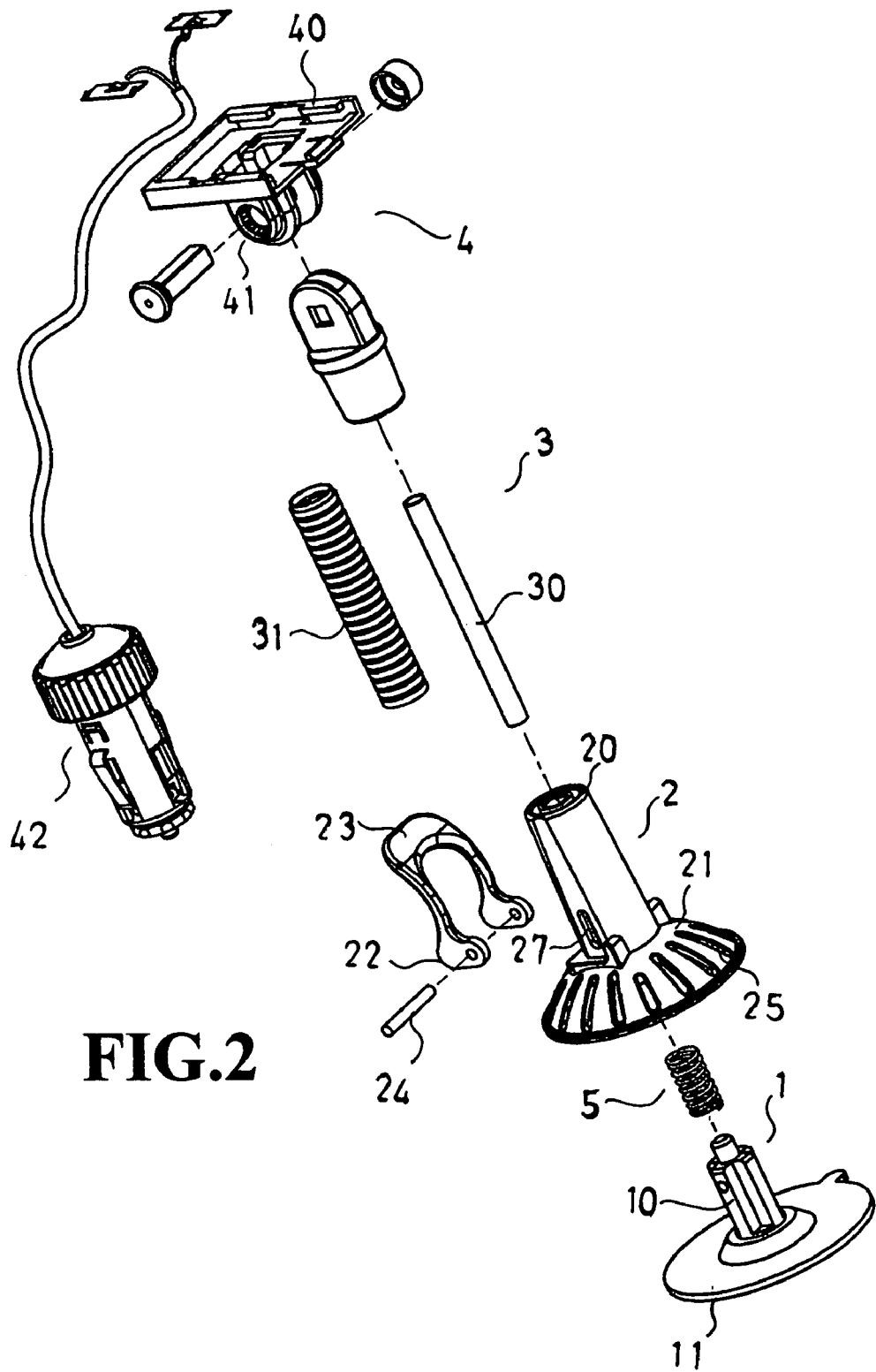
FIG. 2 is an exploded view of the sucking disk type hanging pole according to a preferred embodiment of the present invention.
Figure 3:
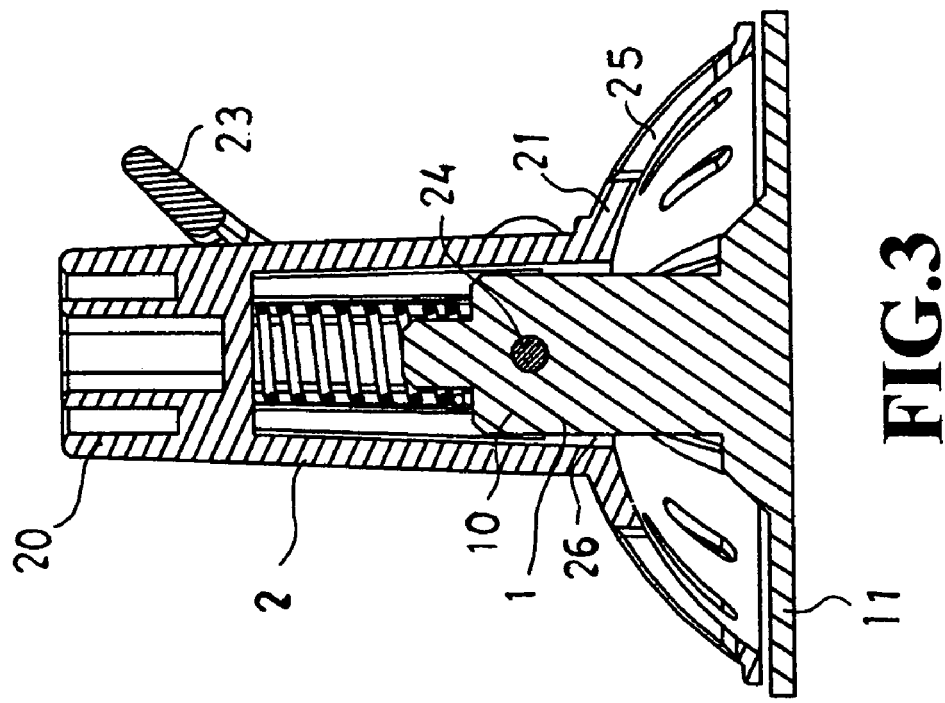
FIG. 3 is a cross-sectional view of part of the sucking disk type hanging pole of the present invention at the initial application stage.
Figure 4:
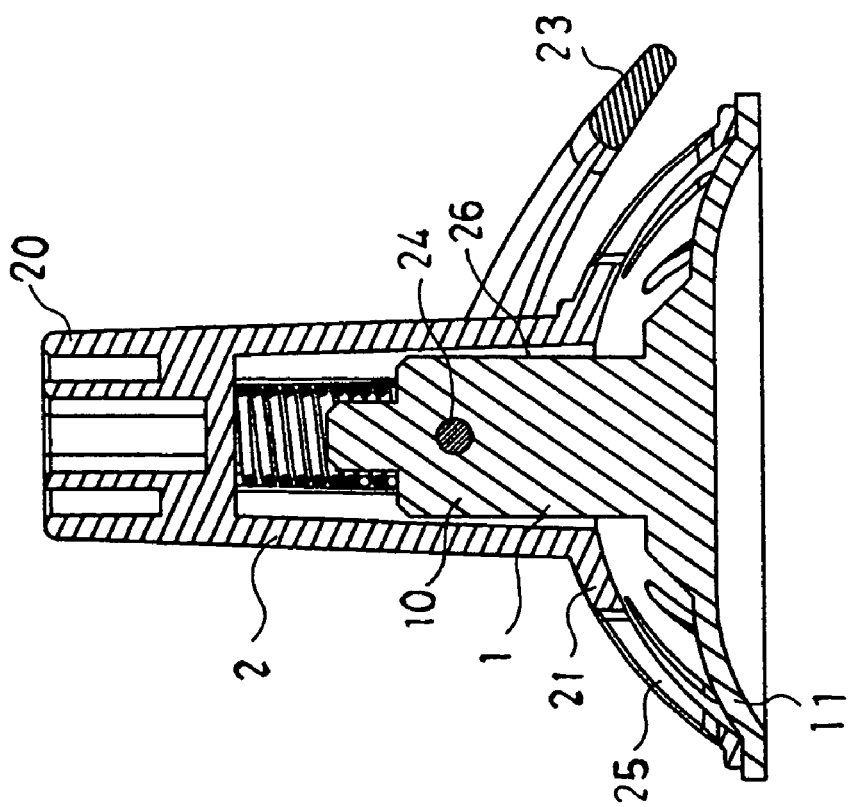
FIG. 4 is a cross-sectional view of part of the sucking disk type hanging pole of the present invention at the a final application stage.

To make it easier for our examiner to understand the objective of the invention, its structure, innovative features, and performance, we use a preferred embodiment together with the attached drawings for the detailed description of the invention.

Please refer to the figures for the present invention. The present invention comprises a sucking disk body 1, a stand 2, a hanging pole 3 and a retaining base 4; wherein the sucking disk body 1 is a structure having a protruded cylindrical shaft 10 on top and a rubber sucking disk 11 on bottom; the stand 2 comprises a connecting sleeve 20 on top and a shell plate 21 on bottom; the shell plate 21 is slightly smaller than a sucking disk 11 of hte sucking disk body 1 and has a plurality of slots 25, a slot hole 26 disposed at center of the shell plate 21 and interconnected to a bar-shaped sliding groove 27 on a side; a spring 5 in the groove hole 26 props a protruded cylindrical shaft 10 of the sucking disk body 1, and the protruded cylindrical shaft 10 is pivotally coupled to the latch member 23 by passing the pivotal axle shaft 24 through the sliding groove 27 and the periphery of the latch member 23 forms a cam edge 22 which is pressed by the spring 5 to push the outer surface of the shell plate 21 of hte stand 2. The hanging pole 3 is a flexible pole with a metal rod 30 in the middle and covered with plastics 31 and has an embedding member individually disposed at the upper and lower ends of the hanging pole 3 for coupling with the retaining base 4 and the stand 2; an embedding base 40 is disposed at the top of the retaining base 4 for coupling with the fixing object. A rotary adjustable structure 41 for adjusting the angle and a power adaptor 42 for connecting an external power supply may be added if needed.

In the actual application, users can lift the latch member 23 to push the external surface of the shell plate 21 with a shorter distance of the cam edge 22 so that the spring 5 moves the sucking disk 11 of the sucking disk body 1 formed, and then pushes the pivotal axle shaft 24 all the way to the bottom along the sliding groove 27 to presses the sucking disk 11 forward to separate the shell disk 21 of the stand 2, and then presses against the sucking disk 11 to attach the fixing object such as the ceramic tile or glass. Further, users can turn the latch member 23 downward, so that the cam edge 22 with a longer distance pushes the outer surface of the shell plate 21 to drive the shell disk 21 of the stand 2 to move down and presses against the periphery of the sucking disk 11 while driving the pivotal axle shaft 24 to move to the top along the sliding groove 27 to pull the sucking disk 1 upward. Since the periphery of the sucking disk 11 is pressed tightly by the shell plate 21, therefore the vacuum chamber at the middle of the sucking disk 11 is expanded. The expanded vacuum chamber can give a stronger sucking effect for attaching the whole hanging pole onto a smooth fixing object such as a ceramic tile or glass. Since the disk body 21 has the plurality of slots 25, therefore the shell plate 21 can be deformed even with a hard structure and thus causes the slightly curved surface to expand and contract for a deformation and press tightly against the periphery of the sucking disk 11 for a secure sucking effect.

Furthermore, with the flexibility of the hanging pole 3 and the rotary adjustable structure 41 can be bent quickly to adjust the direction and height of the retaining base 4 to provide an appropriate position for installing the fixing object. If it is necessary to remove the whole set of the hanging pole, the user can lift the latch member 23 to change the distance of the cam edge 22 from the external surface of the shell plate 21 so that the spring 5 pushes the sucking disk 11 to drive the pivotal axle shaft 24 to move downward along the sliding groove 27 and resume the vacuum chamber to the original state, and drive the shell plate 21 of the stand 2 to move backward and release the pressing action of the sucking disk 11. Such arrangement allows users to release the sucking action and provides a simple structure and components, which can achieve the purposes for economic and convenient production and purchase.

In summation of the description above, the present invention overcomes the shortcomings of the prior-art and enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements.

What is claimed is:

1. A sucking disk hanging pole selectively connected to a surface of a structure comprising:
    a) a sucking disk body having:
        i) a cylindrical shaft protruding from a top thereof; and
        ii) a rubber sucking disk located on a bottom thereof;
    b) a stand located on a top of the sucking disk body and having:
        i) a connecting sleeve located on a top thereof; and
        ii) a shell plate located on a bottom thereof and having a slot hole located in a center thereof, a through hole located through a side thereof, and a plurality of slots located around an outer periphery thereof, the plurality of slots allowing the shell plate and the rubber sucking disk to be deformed to match a contour of the surface of the structure, the through hole communicating with the slot hole, the shell plate having a diameter smaller than a diameter of the rubber sucking disk;
    c) a latch member being pivotally connected to the cylindrical shaft by an axial shaft inserted through the through hole and having a cam edge, the latch member being movable between first and second positions;
    d) a spring located in the slot hole around the cylindrical shaft and pressing the cylindrical shaft outwardly;
    e) a retaining base; and
    f) a hanging pole being a flexible rod structure and having a metal rod wrapped in a plastic material, the hanging pole is connected to the
        connecting sleeve at a first end thereof and pivotally connected to the retaining base at a second end thereof,
    wherein, when the latch member is in the first position, a shorter surface of the cam edge engages the stand, the axial shaft is located at a bottom of the through hole moving the cylindrical shaft to an outward position in the slot hole and contracting a vacuum chamber of the rubber sucking disk, and, when the latch member is in the second position, a longer surface of the cam edge engages the stand, the axial shaft is located at a top of the through hole moving the cylindrical shaft to an inward position in the slot hole and expanding a vacuum chamber of the rubber sucking disk.

2. The sucking disk hanging pole according to claim 1, wherein the retaining base having a power adapter.

3. The sucking disk hanging pole according to claim 1, wherein the retaining base having a rotary adjustable structure.

4. The sucking disk hanging pole according to claim 1, wherein the retaining base having an embedding base.

* * * * *